Dec. 3, 1957   R. D. LACOE, JR   2,814,965
SLIDE CHANGER FOR PROJECTORS
Filed Oct. 9, 1956   2 Sheets-Sheet 1
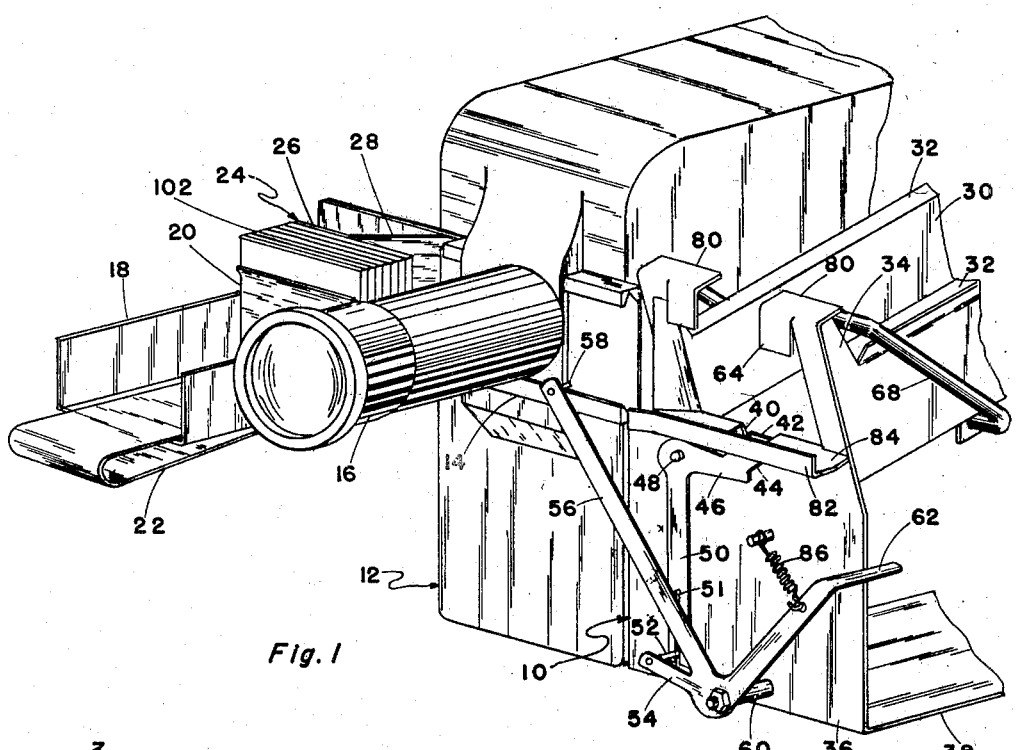
Fig. 1
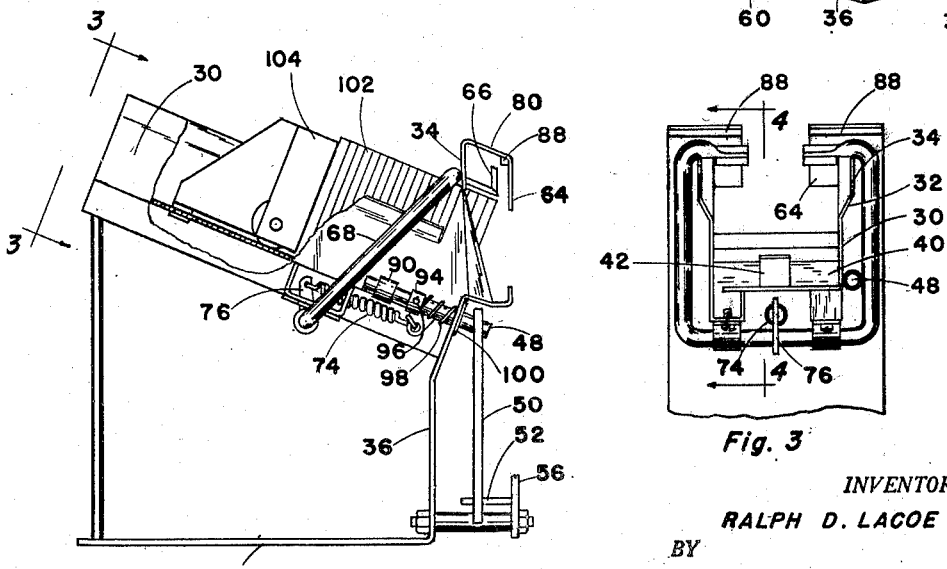
Fig. 2
Fig. 3
INVENTOR.
RALPH D. LACOE Jr.
BY
Knox & Knox Dec. 3, 1957 R. D. LACOE, JR 2,814,965
SLIDE CHANGER FOR PROJECTORS
Filed Oct. 9, 1956 2 Sheets-Sheet 2

INVENTOR.
RALPH D. LACOE Jr.
BY
Knox & Knox

United States Patent Office 2,814,965
Patented Dec. 3, 1957

2,814,965

SLIDE CHANGER FOR PROJECTORS

Ralph D. Lacoe, Jr., San Diego, Calif.

Application October 9, 1956, Serial No. 614,975

15 Claims. (Cl. 88—28)

This invention relates generally to slide changers for projectors, and more specifically to means for feeding photographic slides in sequence from a magazine toward the gate of a projector.

A primary object of this invention is to provide a slide changer which will rapidly or slowly select slides from a plurality of such slides in a magazine, and translate these slides to the projector without danger of jamming, even though slides having imperfect edges are used, and even though the slides be of different thicknesses.

It is another object of this invention to provide a slide changer wherein the slides are at all times easily accessible, the embodiment illustrated in this disclosure being that of a slide changer disposable laterally of the projector and presumably secured thereto by any suitable means, while still having all parts thereof exposed for easy access.

Still another object of this invention is to provide a slide changer which is particularly susceptible for combination with means to pre-heat the slides, and with means for reviewing the slides, the structural details of the pre-heating and reviewing assemblies being, however, separate inventions for which separate applications for patent will be filed.

A last object to be mentioned specifically is to provide a slide changer which does not mutilate the slides or cause excessive wear therein.

With these objects definitely in view, along with other objects which will appear hereinafter as this description proceeds, this invention resides in the novel construction, combination and arrangement of elements and portions as will be hereinafter described in the specification, illustrated in the drawings and pointed out in the claims.

In the drawings:

Figure 1 is an isometric view of a portion of a projector and the front portion of the present slide changer, it being noted that no cover for the slide changer is illustrated although any suitable cover may be used if desired;

Figure 2 is a side elevational view of the slide changer, certain portions being broken away and the underlying portions shown in section and in elevation, the view being taken from the side of the slide changer adjacent to the projector as illustrated in Figure 1;

Figure 3 is a fragmentary elevational view of the magazine, the view being taken from the rear side thereof and being fragmentary in character, the viewpoint being indicated by the section lines 3—3 in Figure 2;

Similar characters of reference designate similar or identical elements and portions throughout the specification and throughout the different views in the drawings.

Figure 4:
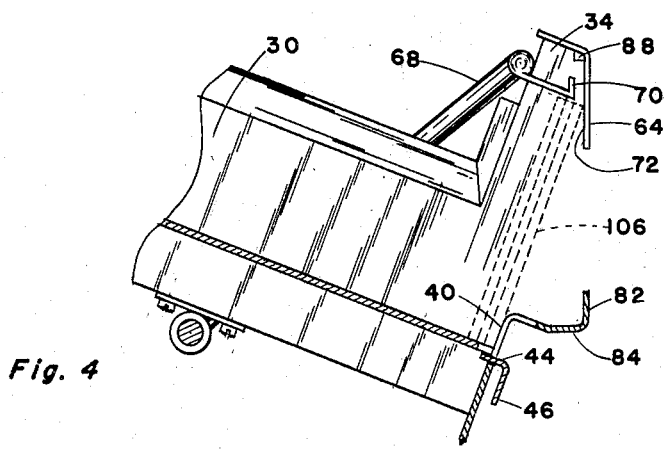
Figure 4 is a vertical sectional view taken on the line 4—4 in Figure 3, this view being designed to indicate the position of the slides referred to hereinafter as the "first position"

Referring now to the drawings in detail, this invention is for use with a projector and this invention comprehends the combination of the slide changer generally indicated at 10 with such a projector which is fragmentarily indicated by the numeral 12. While the particular character of the projector may not be particularly material in this disclosure, a projector having the general character indicated is preferable for use of this invention. Such a projector has a slide guide 14 leading to the projection gate, a focusing lens tube 16 and a receiver tray 18 disposed on the opposite side of the focusing lens tube. As illustrated, the receiver tray 18 is provided with a sliding retainer 20 having a returned portion 22 which is frictionally engaged with the bottom plate of the tray 18. A slide deflector 24 constitutes an essential part of the receiving tray assembly, this deflector having a flat terminal portion 26 against which the slides rest after being moved completely into the receiving tray, and an angulated portion 28 which guides the forward end of the slide as it enters the tray so as to deflect it into offset relation from the next succeeding slide, for purposes which need not be gone into in this disclosure.

Coming now to the slide changer itself, this assembly includes a magazine 30 having flaring upper edge portions 32 and generally defining a trough-like structure commonly used in this art. At what will be considered the forward end of the magazine 30 there is provided a pair of stanchions 34, these stanchions being preferably rigidly connected to a support 36 which is illustrated as a plate having a base portion 38. It is important to note that the particular mode of supporting the magazine, and for that matter, the particular shaping of the magazine and said stanchions is immaterial to the principal concepts in this invention, but some such means must be provided in order to support a plurality of slides at the proper height and in the proper relation to the projector 12.

At the forward end of the magazine 30, there is provided a primary stop 40 of step form. In other words, this primary stop has a portion extending transversely inwardly of the magazine and another portion extending forwardly, and an aperture 42 is provided in both portions of the primary stop to allow access to a feeder element 44. This feeder element, as illustrated, constitutes a flange-like portion on a bell crank 46, and this bell crank is pivoted at 48 on the slide changer frame which is illustrated in the drawings as constituted of a plate 36. The bell crank 46 has an operating lever 50 and is slotted as indicated at 51 to receive a drive pin 52 which is, in turn, actuated by a short lever 54. The lever 54, as illustrated, is unitary with what will be termed herein the translating arm 56, it being noted that this translating arm has a slide-engaging member 58 of pin-like form on its free end for direct engagement with the slide in the feeding thereof, and the translating arm 56 is pivoted as at 60 so that this slide-engaging member 58 traverses the space immediately in front of the primary stop 40, when the operating handle 62 is moved in the obvious manner. At this point, it should be again stressed that the illustrated mechanism is susceptible of major changes in form, the result required being only the traversing action of the slide-engaging member 58, synchronized with the action of the feeder element 44. The necessity for such synchronization will be clearer in the light of the following description of the other cooperating elements.

At the same time as the slides in the magazine 30 engage the primary stop 40, the opposite edge portion of the foremost slide concerned will engage a pair of opposed stops 64 supported on the stanchions 34. A biased element 66 is provided to engage the foremost slide at the same time, this biased element being fixed to the end of a U-shaped bar 68 pivoted on the magazine 30 and having a working face 70 in confronting relation to the opposed stop 64, or more accurately, in opposed relation to the working face 72 of this opposed stop 64. If reference be had to Figure 2, it will be evident that the biased element 66 is urged toward the opposed stop 64 by a spring 74 secured at one end to the magazine in any suitable manner and secured at the other end, under tension, to a bell crank 76 on the adjacent portion of the U-shaped bar 68, so that the biasing member 66 is constantly urged in a direction bringing the working face 70 close to but not touching the working face 72, the rear edges of the stanchions 34 acting, by engaging bar 68, as stops to limit the forward movement of the biased element 66 when no slides are present.

In the illustrated form, the stanchions 34 have canopy-like portions 80 and the said opposed stops 64 are integral with these canopy-like portions. An outer stop 82 is provided at the forward end of the magazine 30 and, as represented, is integral with the extending portion 84, this extending portion being preferably of somewhat trough-like form and, in the embodiment disclosed, being of such dimension that the outer stop 82 is disposed vertically beneath and in opposed relation to the opposed stops 64. A spring 86 is secured at one end to the support plate 36 and at the other end to an intermediate portion of the handle 62, to bias this handle and the parts connected therewith in one direction. At the end of the opposed stops 64, and within the canopy-like portions 80, there are provided a pair of guide stops 88. These guide stops have two functions, inasmuch as they limit the upward movement of the foremost slide while insuring the said foremost slide against tilting, the secondary function being that of an auxiliary guide member to operate in cooperation with the trough-like extending portion 84, as the slide is translated toward the projection gate.

Any suitable means for mounting the operating lever 50 may be used, the structure illustrated comprising a bearing 90 fixed to the side of the magazine 30 and in which the shaft 48 is mounted, the operating lever 50 being rigidly secured to the forward end of the shaft 48. A collar 94 is secured on an intermediate portion on the shaft 48 by means of a set screw 96 or its equivalent and a spring 98 is compressed between this collar and an adjacent portion of the support plate 36, all as clearly indicated in Figure 2. A shoulder 100 or equivalent is provided on the shaft 48 on the side of the plate 36 remote from the collar 94 and the spring 98 biases the shaft in one direction so that the shoulder 100 is at all times retained in abutment against the corresponding part of the support plate 36 and a very accurate positioning of the feeder element 44 is attained by this structure.

Figure 5:
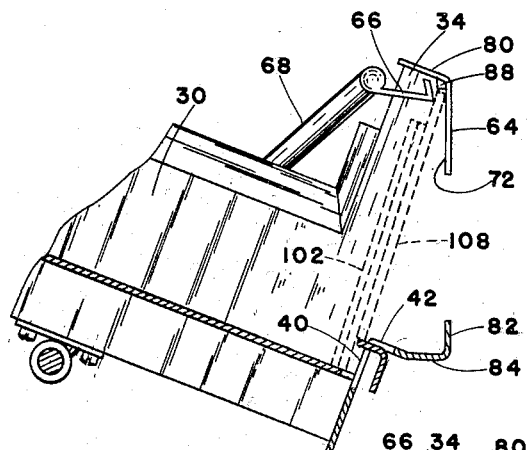
Figure 5 is a view similar to Figure 4 and showing the foremost slide in the position hereinafter referred to as the "second position"

The operation of this invention will be clearly understood from a consideration of the foregoing description of the mechanical details thereof. However, in recapitulation, the slides 102 are stacked in the magazine and are pressed forwardly by any suitable weighted element, as indicated at 104 in Figure 2. The foremost slide 106 is biased into what has been hereinbefore described as the first position as best illustrated in Figure 4 with one side of the slide abutting the opposed stop 64 and the opposite side of the slide abutting the primary stop 40. If we now assume that the operating handle is in the position indicated in Figure 1, and is now depressed, the slide-engaging element 58 will traverse the outer stop 82, and the angular relationships of the bell crank elements 46 and 50 in conjunction with the leverage relationships between the elements 54, 52 and 50 are critically predetermined so that the slide engaging member has reached a position beyond the primary stop 40 before the feeder element 44 has moved sufficiently within the aperture 42 to dislodge the corresponding edge portion of the foremost slide 106 from this primary stop. When the feeder element has fully dislodged the foremost slide 106 from the primary stop 40, the forward pressure of the succeeding slides, augmented by the weight element 104 pivots the foremost slide 106 about the working face 72 of the opposed stops 64 from the position indicated at 108, in Figure 5, to the third position indicated at 110 in Figure 6. The biasing member 66 defines one side of the aperture between this biasing element and the working face 72. This space as thus defined will admit an edge of the minimum thickness slide and the biasing member can retract against the action of the spring 74 to admit a slide of greater thickness, while, by pressing down upon the upper edges of subsequent slides, preventing said subsequent slides from being moved with the said foremost slide. It is noteworthy that the spring 74 must be of critical strength to permit a slide to assume the position indicated at 108 without bending the slide or otherwise deforming the same. The spring 74 is, however, strong enough to overcome the friction between any subsequent slides and the said foremost slide, thus preventing more than one slide from being fed at one time. The guide stops 88 limit the upward movement of the slides and prevent tilting and at a later stage function as guides for the top of the slides as they are moved toward the projection gate.

Figure 6:
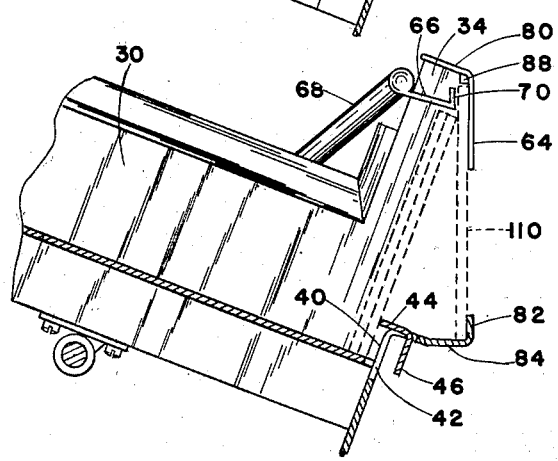
Figure 6 is a view similar to Figures 4 and 5 and showing the foremost slide in the position hereinafter referred to as the "third position."

As described above, the working face 72 is disposed at an acute angle to the plane of the primary stop 40. As immediately above described, the succeeding slides themselves tend to pivot the foremost slide from the position 108 to the position 110. However, the biased element 66 also functions toward the same end by pressing on rear face of the upper edge portion of the foremost slide and urging this foremost slide against the working face 72. It will be noted that as illustrated in Figure 6, the working faces 70 and 72 define the sides of a channel. The outer stop 82 further limits the pivotal movement of the foremost slide, and this stop 82, along with the extending portion 84, act as guides for the slide as it is moved laterally by the slide-engaging member 58 in the return throw of the translating arm 56, under the influence of the actuating spring 86. Obviously the feeder element 44 will be retracted during the movement of the translating arm 56 just described, and the cycle is repeated for the next slide.

It is noteworthy that this slide changer can be tilted at any angle, provided means are present to prevent the slides from falling from the magazine and adequate means are used to urge the slide in the direction corresponding to that described as the forward direction in this disclosure, the operation of the slide changer remaining substantially equivalent to that described above. In particular, it is conceived that the magazine may be disposed in a vertical position or the complete changer used in a position rotated through 90 degrees about a horizontal axis from the position shown in Figure 1.

It is understood that considerable variation from the form of this invention described in detail above can be resorted to without departure from the spirit and scope of this invention, and that the specification and drawings are to be considered as illustrative rather than limiting.

I claim:

1. A photographic slide changer comprising: a magazine for a supply of slides; means to urge the slides in a forward direction along said magazine; a primary stop near the forward end of said magazine and projecting inwardly of the magazine from one side thereof; an opposed stop on the opposite side of said magazine; a biased element shiftably mounted on said magazine and having means to urge said element forwardly toward said opposed stop; a feeder member shiftably mounted adjacent said primary stop to push the foremost slide out of a first position of engagement with said primary stop into a second position of engagement with and between said opposed stop and said element; said opposed stop and biased element being configured to pivot the slide about an axis adjacent said opposed stop, into a third position; and translating means to engage the slide in said third position and to move the slide in a direction normal to said forward direction.

2. Apparatus according to claim 1 and wherein said opposed stop has a working face disposed at an acute angle to the longitudinal axis of the magazine.

3. Apparatus according to claim 1 wherein said biased element has a secondary function and constitutes a stop to prevent more than one slide from being pushed into said second position.

4. Apparatus according to claim 1 wherein said biased element has a secondary function and constitutes a stop to prevent more than one slide from being pushed into said second position; said means to urge said element forwardly being such that the element will yield to allow an over-sized slide to be pushed into said second position, while having sufficient force to overcome the friction between said foremost slide and the succeeding slide, thus overcoming the tendency for more than one slide at a time to be pushed into said second position.

5. Apparatus according to claim 2 wherein said element has a working face disposed at an acute angle to the longitudinal axis of the magazine.

6. A photographic slide changer comprising: a magazine for a supply of slides; means to urge the slides in a forward direction along said magazine; a primary stop near the forward end of said magazine and projecting inwardly of the magazine from one side thereof; an opposed stop on the opposite side of said magazine; a biased element shiftably mounted on said magazine and having means to urge said element forwardly toward said opposed stop; a feeder member shiftably mounted adjacent said primary stop to push the foremost slide out of a first position of engagement with said primary stop into a second position of engagement with and between said opposed stop and said element; said opposed stop and biased element being configured to pivot the slide about an axis adjacent said opposed stop into a third position; an outer stop at the forward end of said magazine and spaced forwardly of said primary stop to limit forward movement of the portion of the slide remote from said opposed stop as the slide moves into said third position; and translating means to engage the slide in said third position and to move the slide in a direction normal to said forward direction.

7. A slide changer according to claim 6 wherein said opposed stop and said outer stop constitute a guide for the slide as it is moved from said third position by said translating means.

8. A slide changer according to claim 6 wherein said primary and outer stops are adjacent the bottom of said magazine and said opposed stop is adjacent the top of the magazine; and said translating means is a translating arm pivotally mounted on a substantially horizontally axis with one end of the translating arm traversing said outer stop.

9. A slide changer according to claim 6 wherein said primary and outer stops are adjacent the bottom of said magazine and said opposed stop is adjacent the top of the magazine; and said translating means is a translating arm pivotally mounted on a substantially horizontal axis with one end of the translating arm traversing said outer stop; said translating arm being operatively connected with said feeder member, said feeder member completing its operational stroke before said translating arm initiates its operational stroke.

10. A slide changer according to claim 9; and a projector disposed in side by side relationship with said slide changer and having a slide guide aligned with said outer stop to receive the slides moved by said translating means.

11. A photographic slide changer comprising: a magazine for a supply of slides; means to urge the slides in a forward direction along said magazine; a primary stop near the forward end of said magazine and projecting inwardly of the magazine from one side thereof; an opposed stop on the opposite side of said magazine; a biased element shiftably mounted on said magazine and having means to urge said element forwardly toward said opposed stop; a feeder member shiftably mounted adjacent said primary stop to push the foremost slide out of a first position of engagement with said primary stop into a second position of engagement with and between said opposed stop and said element; said means to urge being such that said element will yield to allow an oversized slide to be pushed into said second position, while having sufficient force to overcome the friction between said foremost slide and the succeeding slide, thus overcoming the tendency for more than one slide at a time to be pushed into said second position, said opposed stop constituting a fulcrum about which said foremost slide pivots into a third position; and translating means to engage the slide in said third position and to move the slide in a direction normal to said forward direction.

12. A slide changer according to claim 11 wherein said opposed stop has a guide stop adjacent the edge thereof remote from said primary stop, said guide stop preventing tilting of the slide as it reaches said second position and also serving as a guide for the corresponding edge of the slide as it is translated from said third position.

13. A slide changer according to claim 11 wherein said biased member is mounted for pivotal movement about an axis extending transversely of the magazine and disposed rearwardly of said opposed stop, said biased member defining one side of an opening between said opposed stop and the biased member into which an edge portion of said foremost slide is pushed as it assumes said second position, said biased member being pivotally moved slightly rearwardly and upwardly by said foremost slide as it assumes said second position.

14. A photographic slide changer, comprising: a magazine for a plurality of slides; means urging the slides in a forward direction along said magazine; a primary stop near the forward end of said magazine positioned to engage one edge of the foremost slide; an opposed stop positioned to engage the opposite edge of the foremost slide, and having a working face upwardly and rearwardly inclined with respect to the plane of the foremost slide; a feeder member shiftably mounted adjacent said primary stop to push the foremost slide from a first position of engagement with said stops in a direction towards said opposed stop to disengage said one edge with respect to said primary stop, said working face acting to rearwardly tilt the foremost slide into a second position against the forwardly urged subsequent slides which act upon disengagement of said one edge with the primary stop to pivot the slide about an axis adjacent said opposed stop, into a third position; and translating means to engage the slide in said third position and move it edgewise therefrom in a direction parallel to said axis.

15. A photographic slide changer, comprising: a magazine for a plurality of slides; means urging the slides in a forward direction along said magazine; a primary stop near the forward end of said magazine positioned to engage one edge of the foremost slide; an opposed stop positioned to engage the opposite edge of the foremost slide, and having a working face upwardly and rearwardly inclined with respect to the plane of the foremost slide; a feeder member shiftably mounted adjacent said primary stop to push the foremost slide from a first position of engagement with said stops in a direction towards said opposed stop to disengage said one edge with respect to said primary stop, said working face acting to rearwardly tilt the foremost slide into a second position against the forwardly urged subsequent slides which act upon disengagement of said one edge with the primary stop to pivot the slide about an axis adjacent said opposed stop, into a third position; means preventing other than the foremost slide being pushed from said first position; and translating means to engage the slide in said third position and move it edgewise therefrom in a direction parallel to said axis.

References Cited in the file of this patent
UNITED STATES PATENTS

| | | |
|---|---|---|
| 2,226,367 | Boline | Dec. 24, 1940 |
| 2,705,437 | Lessman | Apr. 5, 1955 |